(No Model.)

A. BURKART-STALDER.
HEATING DEVICE.

No. 530,390. Patented Dec. 4, 1894.

UNITED STATES PATENT OFFICE.

AUGUST BURKART-STALDER, OF BERNE, SWITZERLAND.

HEATING DEVICE.

SPECIFICATION forming part of Letters Patent No. 530,390, dated December 4, 1894.

Application filed July 17, 1894. Serial No. 517,812. (No model.) Patented in Switzerland January 17, 1893, No. 6,119; in England January 17, 1893, No. 15,640; in Germany January 23, 1893, No. 71,413, and in France July 10, 1893, No. 231,436.

*To all whom it may concern:*

Be it known that I, AUGUST BURKART-STALDER, a citizen of the Swiss Republic, residing at Berne, Switzerland, have invented certain new and useful Improvements in Heating Devices, (for which foreign patents have been granted to me in Switzerland, No. 6,119, dated January 17, 1893; in Great Britain, No. 15,640, dated January 17, 1893; in Germany, No. 71,413, dated January 23, 1893, and in France, No. 231,436, dated July 10, 1893;) and I do hereby declare the following to be a full, clear, and exact description of the invention, such as will enable others skilled in the art to which it appertains to make and use the same.

This invention relates to a heating device or apparatus such as is adapted to be applied to fire-places, stoves, ranges, &c., for providing a better combustion of the fuel and the object of the invention is to provide a device of this character of a simple and inexpensive construction which shall be applicable for use in connection with such fire-places, stoves, ranges, &c., and shall at the same time, by slight and immaterial alteration, be adaptable for use as a heating device alone.

The invention will be hereinafter fully described and its novel features carefully defined in the claim.

Figure 1:
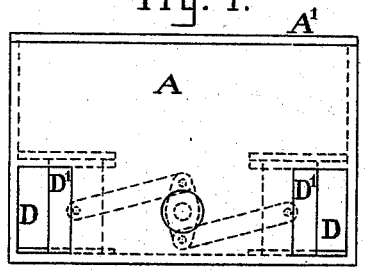
Figure 2:
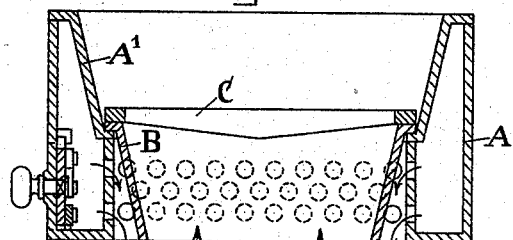
Figure 3:
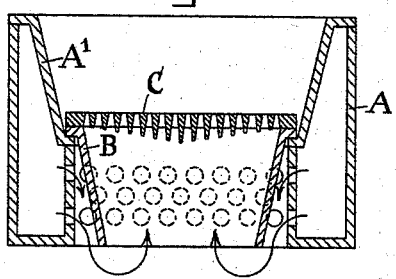
Figure 4:
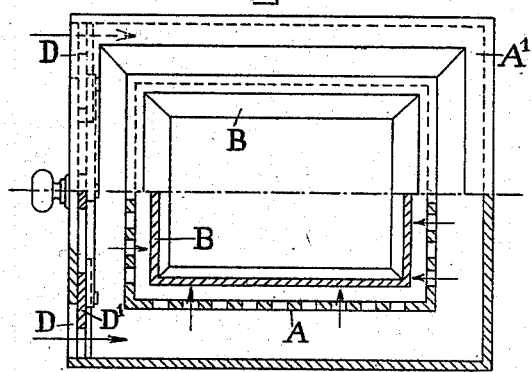
Figure 5:
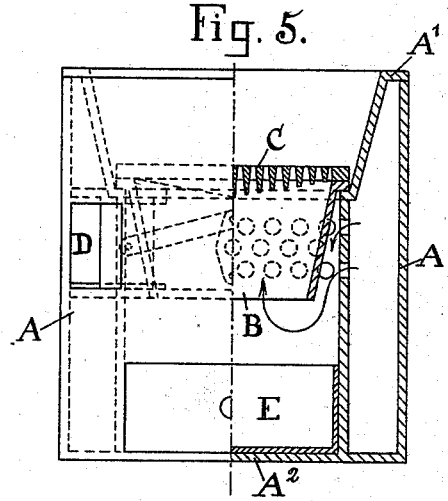
Figure 6:
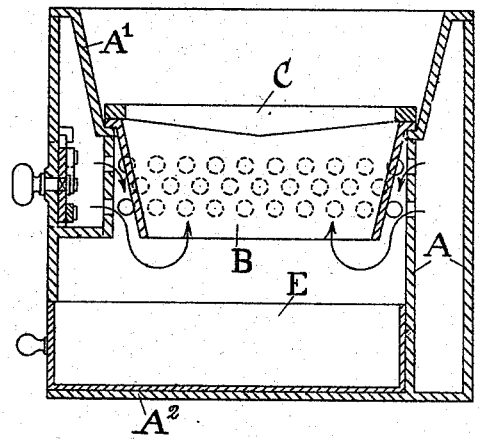

In the accompanying drawings Figure 1 is a front view of a heating device embodying my invention and Figs. 2 and 3 are transverse sections of the same, taken at right angles to one another. Fig. 4 is a sectional plan view of the device. Figs. 5 and 6 are views similar to Figs. 3 and 4, but showing a modified form of the device.

In the views A represents the outer casing of the device, which is of a rectangular form and is imperforate except that one of its walls is provided with air inlets D, D, adapted to be closed by dampers D', D'. At its base, the casing A is provided with an inward projection bearing an upward extension, as clearly seen in Figs. 2 and 3 in which is provided a series of perforations. The upper part of the casing A is open and over its inner side is arranged a flared or conical lining A' which rests at its upper end on the upper edge of the outer wall A and at its lower end on the upper edge of the upward extension of the casing. The lower edge of lining A' is provided with a ledge or shoulder extending around it, on which ledge or shoulder is arranged the lining B also of a conical or flared form, by preference, having imperforate walls arranged slightly inside of the upward perforated extension of casing A and extending to the base of the said casing. Thus it will be seen an air passage is provided from the dampers D, D' through casing A, out at the perforations in the upward extension of the casing, down between the said extension and the outer side of lining B and upward through said lining B as indicated by the arrows through the grate C which rests on the upper edges of lining B.

The device as above described is adapted to be set in ranges, stoves, furnaces and other fire-places where it is desired to obtain the greatest heating effect together with a minimum consumption of fuel. The fuel being placed on the grate C and ignited, the lining A' becomes red-hot and consequently the air flowing through casing A will be highly heated prior to being supplied under the grate and thus the greatest heating effect will be attained.

In the construction seen in Figs. 5 and 6 I have shown the device adapted for use independently of any other fire-place. In this case, the casing A is provided with an ash-pit located below the lining B and provided with air-tight walls and a closed bottom $A^2$. A sliding ash-pan E is also provided to receive the ashes falling from grate C.

It will be seen that my invention is susceptible of considerable modification without material departure from its principles; for instance, in lieu of making the ash-pit in the form seen in Figs. 5 and 6 with a closed bottom $A^2$, it may be provided with an open bottom adapted to allow the ashes to fall therethrough, in which case the use of the drawer or sliding pan E will also be dispensed with.

Having thus described my invention, I claim—

The herein described heating device, consisting of the open top rectangular casing provided at its front with air-inlets and regulating dampers, and at its base with an inward projection having a perforated upward extension, as described, in combination with an inner lining and a grate; the inner lining composed of two flared sections, the upper section having an outer flange at its top, and an inner ledge, at its bottom for resting, respectively, on the upper edges of the casing and its inner perforated extension; the lower section of the lining provided with a top flange for the support of said section and grate, substantially as and for the purpose specified.

In testimony whereof I have affixed my signature in presence of two witnesses.

AUGUST BURKART-STALDER.

Witnesses:
MAX GYSI,
  *Ing.*
C. HANSLIN,
  *Ing.*